US010491870B2

(12) United States Patent
Ichikawa et al.

(10) Patent No.: US 10,491,870 B2
(45) Date of Patent: Nov. 26, 2019

(54) IMAGE DISPLAY APPARATUS AND IMAGE DISPLAY METHOD

(71) Applicants:Yoichi Ichikawa, Kanagawa (JP); Naoki Sakai, Kanagawa (JP); Shohta Kobashigawa, Tokyo (JP); Hiroki Hiraguchi, Tokyo (JP); Yumiko Kishi, Kanagawa (JP)

(72) Inventors: Yoichi Ichikawa, Kanagawa (JP); Naoki Sakai, Kanagawa (JP); Shohta Kobashigawa, Tokyo (JP); Hiroki Hiraguchi, Tokyo (JP); Yumiko Kishi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 91 days.

(21) Appl. No.: 15/429,605

(22) Filed: Feb. 10, 2017

(65) Prior Publication Data
US 2017/0230628 A1 Aug. 10, 2017

(30) Foreign Application Priority Data

Feb. 10, 2016 (JP) .................................. 2016-023721
Jan. 17, 2017 (JP) .................................. 2017-005874

(51) Int. Cl.
*H04N 9/31* (2006.01)
*G06T 5/00* (2006.01)
(Continued)

(52) U.S. Cl.
CPC ........... *H04N 9/3182* (2013.01); *B60K 35/00* (2013.01); *G06T 5/00* (2013.01); *G06T 7/90* (2017.01);
(Continued)

(58) Field of Classification Search
CPC .... H04N 9/3182; H04N 9/3194; B60K 35/00; B60K 2350/352; B60K 2350/2052; G06T 5/00; G06T 7/90
(Continued)

(56) References Cited

U.S. PATENT DOCUMENTS

2009/0168109 A1 7/2009 Kishi
2014/0253579 A1 9/2014 Babaguchi
(Continued)

FOREIGN PATENT DOCUMENTS

EP 2 775 339 A1 9/2014
JP 5-278498 10/1993
(Continued)

OTHER PUBLICATIONS

Extended European Search Report dated Jul. 5, 2017 in Patent Application No. 17155253.2.
(Continued)

*Primary Examiner* — Mark W Regn
(74) *Attorney, Agent, or Firm* — Oblon, McClelland, Maier & Neustadt, L.L.P.

(57) ABSTRACT

An image display apparatus and a method of displaying an image. The image display apparatus includes an image-light projection device configured to display a display image, and a display controller configured to determine chromaticity coordinates of a display color of the display image based on data of a chromaticity coordinate area of background light such that the display color of the display image is set outside the chromaticity coordinate area of the background light. The method includes determining chromaticity coordinates of a display color of a display image based on data of a chromaticity coordinate area of background light such that the display color of the display image is set outside the chromaticity coordinate area of the background light.

20 Claims, 14 Drawing Sheets

(51) Int. Cl.
*G06T 7/90* (2017.01)
*B60K 35/00* (2006.01)

(52) U.S. Cl.
CPC ..... *H04N 9/3194* (2013.01); *B60K 2370/334* (2019.05); *B60K 2370/52* (2019.05)

(58) Field of Classification Search
USPC ........................................................ 345/204
See application file for complete search history.

(56) References Cited

U.S. PATENT DOCUMENTS

2014/0292637 A1* 10/2014 Peng ................ G02B 27/0172
 345/156
2016/0240125 A1 8/2016 Sridharan et al.

FOREIGN PATENT DOCUMENTS

| JP | 6-211070 A | 8/1994 |
|---|---|---|
| JP | 06211070 A * | 8/1994 |
| JP | 2006-165773 | 6/2006 |
| JP | 2014-15127 A | 1/2014 |
| JP | 2015-049409 | 3/2015 |
| JP | 2015-178297 | 10/2015 |
| WO | WO 2015/048911 A1 | 4/2015 |

OTHER PUBLICATIONS

Office Action dated Aug. 15. 2018 in European Patent Application No. 17 155 253.2, citing documents AX & AY therein, 7 pages.
Blankenbach, K. et al., "P-49: Comparison of the Readability of Colour Head-up Displays Using LED and Laser Light Sources" SID 10 Digest, 2010, pp. 1426-1429.
Post. D. L. et al., "Color Contrast Metrics for Complex Images", Human Factors Laboratory, Department of Industrial Engineering and Operations Research, Virginia Polytechnic Institute and State University, 1986, 91 pages.

* cited by examiner

IMAGE DISPLAY APPARATUS AND IMAGE DISPLAY METHOD

CROSS-REFERENCE TO RELATED APPLICATIONS

This patent application is based on and claims priority pursuant to 35 U.S.C. § 119(a) to Japanese Patent Application Nos. 2016-023721 and 2017-005874, filed on Feb. 10, 2016, and Jan. 17, 2017, respectively, in the Japan Patent Office, the entire disclosures of which are hereby incorporated by reference herein.

BACKGROUND

Technical Field

Embodiments of the present disclosure relate to, for example, an image display apparatus such as a heads-up display (HUD) and an image display method.

Background Art

In vehicle-mounted HUDs, it is a key point to improve the viewability (visual recognizability) of a display image. In vehicle-mounted HUDs, light for projecting a display image is reflected by a combiner to generate a virtual image, and a driver visually recognizes the generated virtual image. In this configuration, background such as a road surface is viewable through the generated virtual image. As the level of brightness in the background changes depending on the time periods or environment, the viewability significantly decreases when the brightness of the display of the HUD is low compared with the brightness of the background.

A configuration is known that an illuminance sensor or the like is used to measure the light quantity of environmental light and the brightness of a display is adjusted according to the measured light quantity of environmental light so as to prevent the viewability of a heads-up display (HUD) from decreasing.

SUMMARY

Embodiments of the present disclosure described herein provide an image display apparatus and a method of displaying an image. The image display apparatus includes an image-light projection device configured to display a display image, and a display controller configured to determine chromaticity coordinates of a display color of the display image based on data of a chromaticity coordinate area of background light such that the display color of the display image is set outside the chromaticity coordinate area of the background light. The method includes determining chromaticity coordinates of a display color of a display image based on data of a chromaticity coordinate area of background light such that the display color of the display image is set outside the chromaticity coordinate area of the background light.

BRIEF DESCRIPTION OF THE DRAWINGS

A more complete appreciation of exemplary embodiments and the many attendant advantages thereof will be readily obtained as the same becomes better understood by reference to the following detailed description when considered in connection with the accompanying drawings.

Figure 1:
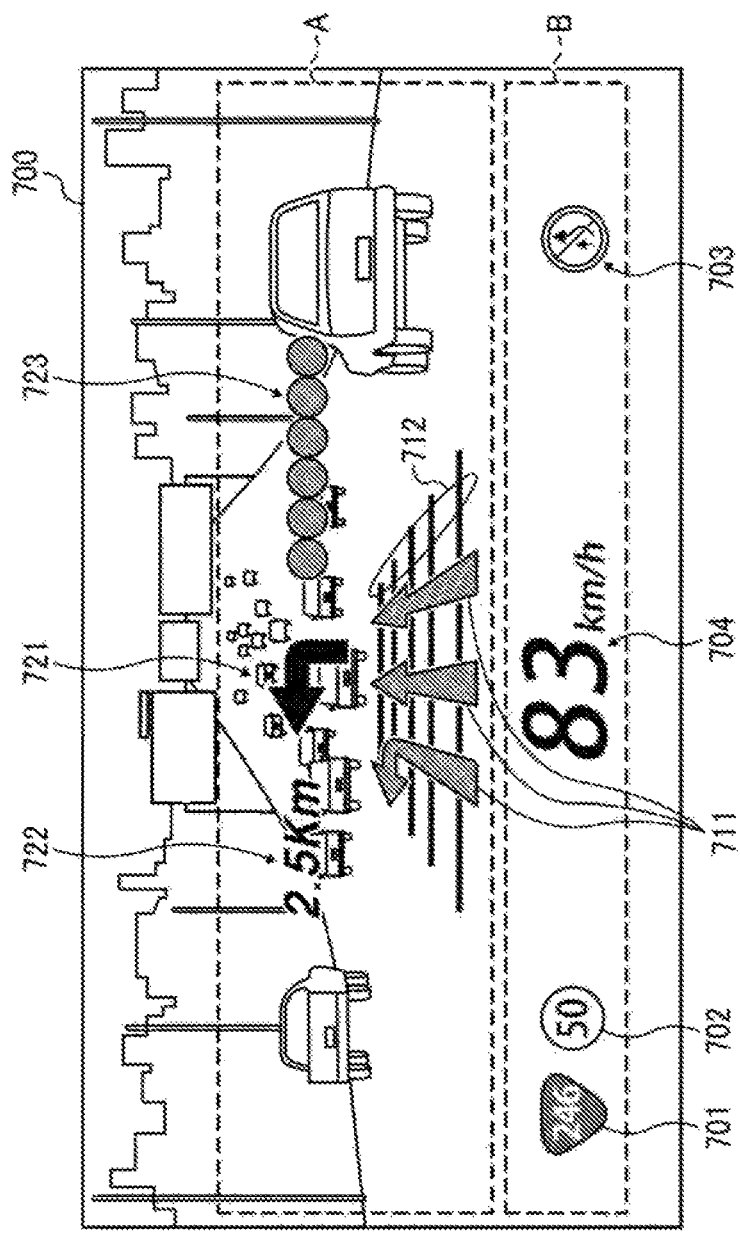
FIG. 1 is a front view of a virtual image displayed in a display area over the sight ahead of a vehicle viewed by a driver through a front windshield, in an on-vehicle HUD, according to a basic embodiment of the present disclosure.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

Some embodiments of the present disclosure are described below with reference to the drawings. Note that like reference signs denote like elements in the description of the embodiments for the purpose of simplification.

Basic Embodiment

In the following description of the basic embodiment, the hardware configuration of an on-vehicle HUD 200, which is used in the first to third embodiments of the present disclosure, is described.

FIG. 1 is a front view of a virtual image displayed in a display area 700 over the sight ahead of a vehicle 301 viewed by a driver 300 through a front windshield 302, in the on-vehicle HUD 200 according to the present basic embodiment.

Figure 2:
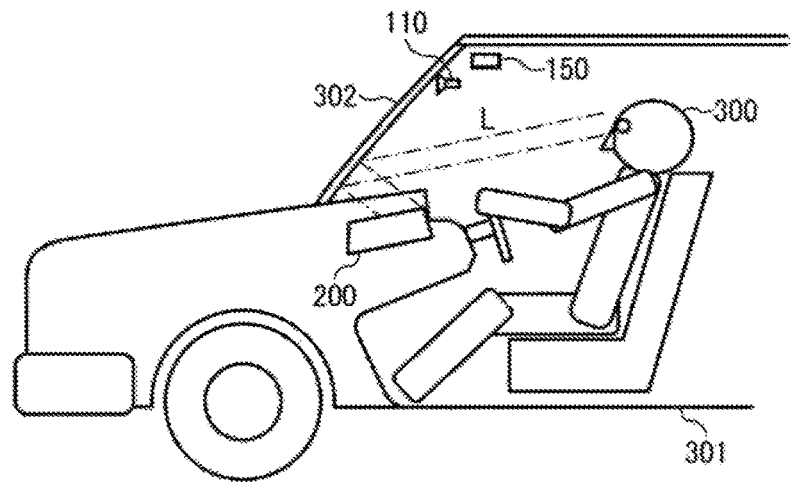
FIG. 2 is a schematic partially-cutaway side view of the configuration of a car for which an on-vehicle HUD is provided, according to a basic embodiment of the present disclosure.

FIG. 2 is a schematic partially-cutaway side view of the configuration of a car for which the on-vehicle HUD 200 according to the present embodiment is provided.

Figure 3:
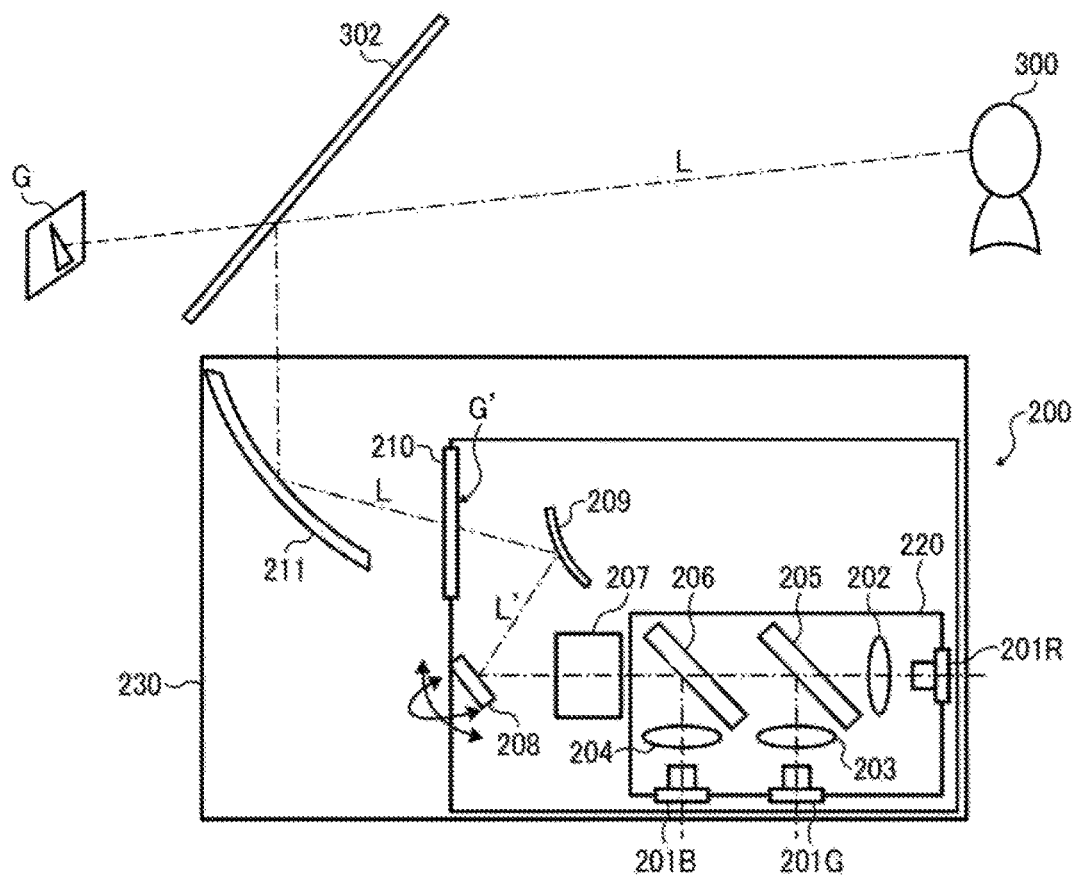
FIG. 3 is a schematic block diagram of the internal structure of an optical system of the on-vehicle HUD illustrated in FIG. 2, according to a basic embodiment of the present disclosure.

FIG. 3 is a schematic block diagram of the internal structure of an optical system of the on-vehicle HUD 200 illustrated in FIG. 2.

In FIG. 2, the on-vehicle HUD 200 according to the present embodiment is installed, for example, in the dashboard of the vehicle 301 that serves as a mobile object. The projection light L, which is the light for projecting an image, that is emitted from the on-vehicle HUD 200 disposed in the dashboard is reflected by the front windshield 302 that serves as a light transmission member, and is headed for the driver 300. Accordingly, the driver 300 can visually recognize a HUD display image such as a navigation image, which will be described later, as a virtual image G. Note that a combiner that serves as a light transmission member may be disposed on the inner wall of the front windshield 302, and the driver 300 may visually recognizes a virtual image formed by the projection light L that is reflected by the combiner.

In the upper portion of the front windshield 302, a front camera 110 that captures an image in front including an image to be displayed by the HUD 200 and its background image through the front windshield 302, and an environmental light sensor 150 that detects the lightness or chromaticity of the environmental light around the display image are provided. The term "lightness" herein indicates brightness, illuminance, luminous intensity, total luminous flux, and a value calculated from a result of measuring the degrees of these items.

In the present embodiment, the optical system or the like of the on-vehicle HUD 200 is configured such that the distance from the driver 300 to a virtual image G becomes equal to or longer than 5 meters (m). In the known on-vehicle HUDs, the distance from the driver 300 to the virtual image G is about 2 m. Usually, the driver 300 observes a point at infinity ahead of the vehicle, or observes a preceding vehicle a few tens of meters ahead of the vehicle. When the driver 300 who is focusing on an object in the distance attempts to visually recognize the virtual image G that is two meters ahead of the vehicle, the crystalline lenses of the eyes need to be moved widely because the focal length greatly varies. In such cases, the time required to adjust the focus of the eyes and focus on the virtual image G becomes longer, and it takes a long time to recognize the detail of the virtual image G. What is worse, the eyes of the driver 300 tend to get tired. Moreover, it is difficult for the driver to realize the detail of the virtual image G, and it is difficult to use the virtual image G to appropriately provide information to the driver.

If the distance to the virtual image G is equal to or longer than 5 m as in the present embodiment, the amount of movement in the crystalline lenses of the eyes is reduced to a less amount of movement than the background art, and the time required to adjust the focus of the eyes and focus on the virtual image G becomes shorter. Accordingly, the driver 300 can recognize the detail of the virtual image G at an early stage, and the possible tiredness of the eyes of the driver 300 can be reduced. Moreover, it becomes easier for the driver to realize the detail of the virtual image G, and it is easy to use the virtual image G to appropriately provide information to the driver. When the distance to the virtual image G is equal to or greater than 5 in, the driver can focus on the virtual image G with almost no convergence motion in the eyes. Accordingly, the sense of distance (change in perception distance) or the depth perception (difference in perception distance), which are expected to be brought by motion parallax, can be perceived as desired in absence of the convergence motion of the eyes. As described above, according to the present embodiment, the driver perceive the information as intended in view of the sense of distance or depth perception of an image.

The on-vehicle HUD 200 illustrated in FIG. 3 includes, in the optical system 230, red, green, and blue laser beam sources 201R, 201G, and 201B, collimator lenses 202, 203, and 204 that are provided for the laser beam sources 201R, 201G, and 201B, respectively, and two dichroic mirrors 205 and 206. The on-vehicle HUD 200 further includes a light quantity adjuster 207, an optical scanner 208, a free-form surface mirror 209, a microlens array 210 that serves as a light dispersing member, and a projector mirror 211 that serves as a light reflecting member. A light source unit 220 according to the present embodiment includes the laser beam sources 201R, 201G, and 201B, the collimator lenses 202, 203, and 204, and the dichroic mirrors 205 and 206, and these elements are unitized by an optical housing.

Each of the laser beam sources 201R, 201G, and 201B may be an LD (semiconductor laser element). The wavelength of the luminous flux that is emitted from the red laser beam source 201R is, for example, 640 nanometer (nm). The wavelength of the luminous flux that is emitted from the green laser beam source 201G is, for example, 530 nm. The wavelength of the luminous flux that is emitted from the blue laser beam source 201B is, for example, 445 nm.

The on-vehicle HUD 200 according to the present embodiment projects the intermediate image formed on the microlens array 210 onto the front windshield 302 of the vehicle 301, such that the driver 300 can visually recognize the magnified intermediate image as a virtual image G. The laser beams of the RGB colors emitted from the laser beam sources 201R, 201G, and 201B are approximately collimated by the collimator lenses 202, 203, and 204, and are combined by the two dichroic mirrors 205 and 206. The light quantity of combined laser beam is adjusted by the light quantity adjuster 207, and then the adjusted laser beam is two-dimensionally scanned by the mirror of the optical scanner 208. The scanned light L' that is two-dimensionally scanned by the optical scanner 208 is reflected by the free-form surface mirror 209 so as to correct the distortion, and then is collected and condensed to the microlens array 210. Accordingly, an intermediate image is drawn.

In the present embodiment, the microlens array 210 is used as a light dispersing member that individually disperses and emits the luminous flux of each pixel of the intermediate image (i.e., each point of the intermediate image). However, any other light dispersing member may be used. Alternatively, a liquid crystal display (LCD) or a vacuum fluorescent display (VFD) may be used as a method of forming the intermediate image G'. However, in order to display the virtual image G with a wide dimension and high brightness, the laser scanning system is desired as in the present embodiment.

In the systems where an LCD or VFD is used, a non-image area of the display area on which the virtual image G is displayed is slightly irradiated with light, and it is difficult to completely shut such light to the non-image area. For this reason, in the systems where an LCD or VFD is used, the non-image area disturbs the visual recognizability of the sight ahead of the vehicle 301. By contrast, if a laser scanning system is adopted as in the present embodiment, the light that irradiates the non-image area of the display area on which the virtual image G is displayed can be completely shut by switching off the laser beam sources 201R, 201G, and 201B. For this reason, if a laser scanning system is adopted as in the present embodiment, the non-image area does not disturb the visual recognizability of the sight ahead of the vehicle 301 as the light from the on-vehicle HUD 200 that may irradiate the non-image area can be completely shut.

When the degree of warning is to be enhanced by gradually increasing the brightness of the warning image that alerts the driver, the display needs to be controlled such that only the brightness of the warning image gradually increases among the various kinds of images displayed in the display area 700. Again, the laser scanning system is suitable for such cases where the display is controlled such that the brightness of a part of the images displayed in the display area 700 is selectively increased. In the systems with the LCD or the VFD, the brightness of the images other than the warning image also increases among the various kinds of images displayed in the display area 700. In such cases, the difference in brightness cannot be increased between the warning image and the other images. Accordingly, the degree of the warning cannot be sufficiently enhanced by gradually increasing the brightness of the warning image.

The optical scanner 208 uses a known actuator driver system such as a micro-electromechanical systems (MEMS) to incline the mirror to the main scanning direction and the sub-scanning direction, and two-dimensionally scans (ras-ter-scans) the laser beams incident on the mirror. The mirror is controlled in synchronization with the timing at which the laser beam sources 201R, 201G, and 201B emit light. The optical scanner 208 may be configured, for example, by a mirror system that includes two mirrors that pivot or rotate around the two axes that are orthogonal to each other.

Figure 4:
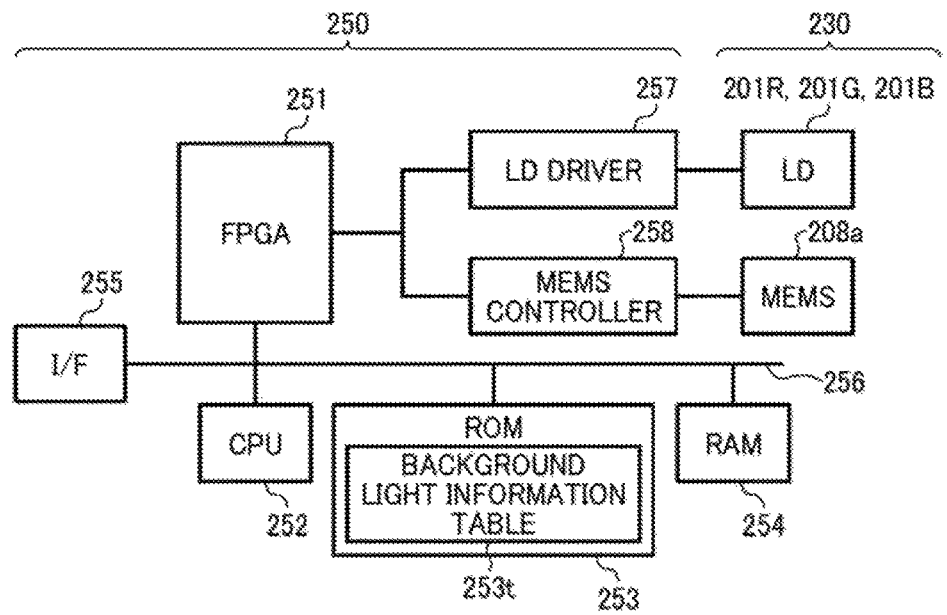
FIG. 4 is a schematic block diagram of the internal structure of a control system of the on-vehicle HUD illustrated in FIG. 2, according to a basic embodiment of the present disclosure.

FIG. 4 is a schematic block diagram of the internal structure of a control system 250 of the on-vehicle HUD 200 illustrated in FIG. 2, according to the present basic embodiment.

As illustrated in FIG. 4, the control system 250 of the on-vehicle HUD 200 includes a field programmable gate array (FPGA) 251, a central processing unit (CPU) 252, a read-only memory (ROM) 253, a random access memory (RAM) 254, an interface (IX) 255, a bus line 256, a laser diode (LD) driver 257, and a micro-electromechanical systems (MEMS) controller 258. The FPGA 251 uses the LD driver 257 to control the operation of the laser beam sources 201R, 201G, and 201B of the light source unit 220. Moreover, the FPGA 251 uses the MEMS controller 258 to controlling the operation of a MEMS 208a of the optical scanner 208. The CPU 252 controls the operation of the on-vehicle HUD 200. The ROM 253 stores various kinds of programs such as an image processing program that is executed by the CPU 252 to control the operation of the on-vehicle HUD 200. The RAM 254 is mainly used as a working area in which the CPU 252 executes a program. The interface 255 allows the on-vehicle HUD 200 to communicate with an external controller such as a controller area network (CAN) of the vehicle 301. For example, the interface 255 is connected to a vehicle navigation device 400, and various kinds of sensor device 500 through the CAN of the vehicle 301.

Moreover, the interface 255 is connected to the front camera 110 that captures an image in front including an image to be displayed by the on-vehicle HUD 200 and its background image through the front windshield 302. Further, the interface 255 is connected to the environmental light sensor 150 that detects the lightness or chromaticity of the environmental light around the display image are provided. As will be described later in detail, the control system 250 performs color correction on a display image according to the first to third embodiments of the present disclosure (see FIG. 7, FIG. 9, and FIG. 11) to correct the colors of the display image that is displayed by the HUD 200.

Figure 5:
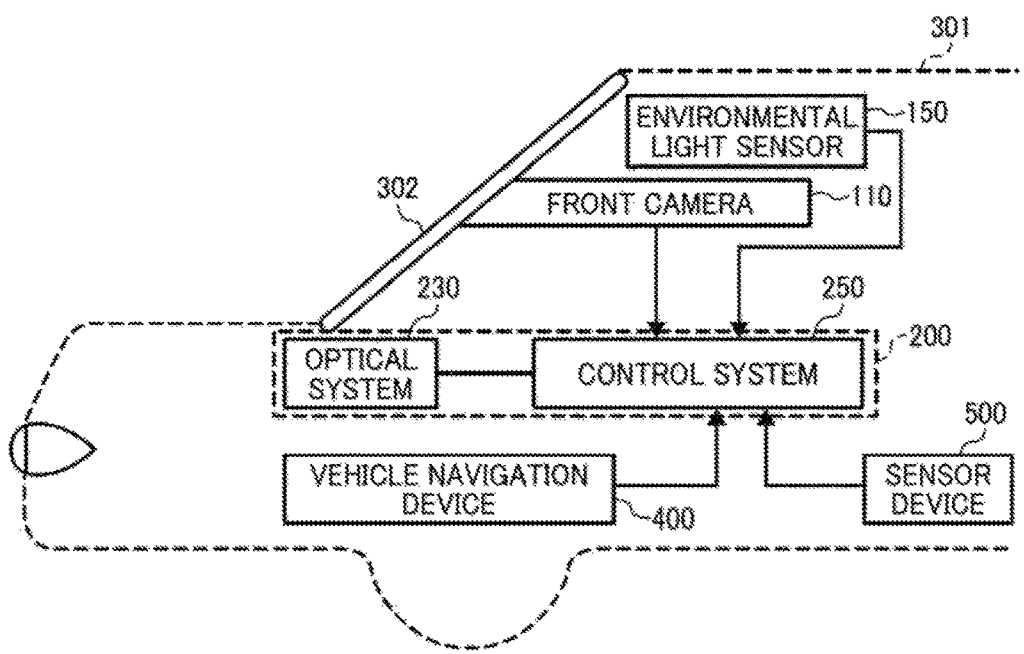
FIG. 5 is a schematic block diagram of the on-vehicle HUD illustrated in FIG. 2 and peripheral equipment, according to a basic embodiment of the present disclosure.

FIG. 5 is a schematic block diagram of the on-vehicle HUD 200 illustrated in FIG. 2 and peripheral equipment, according to the present embodiment.

In the present embodiment, as an information acquisition unit that obtains for-driver information to be provided to a driver via a virtual image G, for example, the vehicle navigation device 400, and the sensor device 500 are provided. The on-vehicle HUD 200 according to the present embodiment includes the optical system 230 that serves as an image-light projection device, and the control system 250 that serves as a display controller.

The vehicle navigation device 400 according to the present embodiment may be any known vehicle navigation device provided for a vehicle or the like. The vehicle navigation device 400 outputs information used for generating a route navigation image to be displayed on a virtual image G, and the information output from the vehicle navigation device 400 is input to the control system 250. The information that is output from the vehicle navigation device 400 includes, for example, as illustrated in FIG. 1, images indicating the number of lanes (traffic lanes) of the road on which the vehicle 301 is traveling, the distance to the next point where the direction is to be changed (for example, a right turn, left turn, and a branch point), and the direction to which the path is to be changed next in order. As such information is input from the vehicle navigation device 400 to the control system 250, the on-vehicle HUD 200 displays navigation images as follows under the control of the control system 250. In particular, navigation images such as a lane indicator image 711, a following-distance presenting image 712, a path indicator image 721, a remaining distance indicator image 722, an intersection or the like name indicator image 723, are displayed on an upper display area A of the display area 700.

In the example image illustrated in FIG. 1, images indicating road-specific information (e.g., road name, and speed limit) is displayed on a lower display area B of the display area 700. The road-specific information is also input from the vehicle navigation device 400 to the control system 250. The control system 250 uses the on-vehicle HUD 200 to display the road-specific information such as a road-name display image 701, a speed limit display image 702, and a no-passing zone display image 703 on the lower display area B of the display area 700.

The sensor device 500 illustrated in FIG. 5 includes one or two or more sensors that detect various kinds of information such as the behavior of the vehicle 301, the state of the vehicle 301, and the environment around the vehicle 301. The sensor device 500 outputs sensing information used for generating an image to be displayed as a virtual image G, and the information output from the sensor device 500 is input to the control system 250. For example, in the example image illustrated in FIG. 1, a vehicle speed display image 704 indicating the vehicle speed of the vehicle 301 (i.e., the textual image of "83 km/h" in FIG. 1) is displayed on the lower display area B of the display area 700. The vehicle-speed information included in the CAN information of the vehicle 301 is input from the sensor device 500 to the control system 250, and the control system 250 controls the on-vehicle HUD 200 to display the textual image indicating the vehicle speed on the lower display area B of the display area 700.

In addition to the sensor that detects the vehicle speed of the vehicle 301, the sensor device 500 includes, for example, (1) a laser radar or imaging device that detects the distance from another vehicle, a pedestrian, or construction such as a guard rail and a utility pole, which exist around (ahead of, on the side of, in the rear of) the vehicle 301, and a sensor that detects the external environmental information (e.g., outside air temperature, brightness, and weather) of the vehicle 301, (2) a sensor that detects the driving action (e.g., braking action, and the degree of acceleration) of the driver 300, (3) a sensor that senses the amount of fuel remaining in the fuel tank of the vehicle 301, and (4) a sensor that senses the state of various kinds of vehicle-borne equipment such as an engine and a battery. As such information is detected by the sensor device 500 device and sent to the control system 250, the on-vehicle HUD 200 can display the information as a virtual image G. Accordingly, the information can be provided to the driver 300.

Next, a virtual image G that is displayed by the on-vehicle HUD 200 according to the present embodiment is described. In the present embodiment, for-driver information that the on-vehicle HUD 200 provides for the driver 300 via a virtual image G may be any information. In the present embodiment, the for-driver information is broadly divided into passive information and active information.

The passive information is the information to be passively recognized by the driver 300 at the timing when a prescribed information provision condition is met. Accordingly, the passive information includes the information to be provided to the driver 300 at the timing when the on-vehicle HUD 200 is configured, and the passive information includes the information whose provision timing has a certain relation with the detail of the information. The passive information includes, for example, security information for driving, and route navigation information. The security information for driving includes, for example, the following distance indicating the distance between the vehicle 301 and the preceding vehicle 350 (i.e., a following-distance presenting image 712 as will be described later), and information including urgent matters for driving (e.g., warning information such as an instruction for urgent action to be taken by a driver, or attention attracting information). The route navigation information indicates a route to a prescribed destination, and such a route is provided to a driver by any known vehicle navigation device. The route navigation information includes, for example, lane information (i.e., the lane indicator image 711) indicating a lane to be taken at an upcoming intersection, and direction-change instruction information indicating a direction change to be made at the next intersection or branch point where the direction is to be changed from the straight-ahead direction. The direction-change instruction information includes, for example, path indicating information (i.e., the path indicator image 721) that indicates the path to be taken at the next intersection or branch point, remaining distance information (i.e., the remaining distance indicator image 722) indicating the distance to the intersection or branch point where the direction change is to be made, and name information of the intersection or branch point (i.e., the intersection or the like name indicator image 723).

The active information is the information to be actively recognized by the driver 300 at the timing specified by the driver himself or herself. The active information is to be provided to the driver 300 only when he or she wishes. For example, the active information includes information where the timing of its provision has low or no relevance to the detail of the information. As the active information is obtained by the driver 300 at the timing when he or she wishes, the active information is usually displayed for a long time or displayed continuously. The active information includes, for example, specific information of the road on which the vehicle 301 is traveling, the vehicle-speed information (i.e., the vehicle speed display image 704) of the vehicle 301, and the current-time information. The road-specific information includes, for example, the road-name information (i.e., the road-name display image 701), the regulation information of the road such as speed limit (i.e., the speed limit display image 702 and the no-passing zone display image 703), and other kinds of information of the road useful for the driver.

In the present embodiment, the for-driver information, which is broadly divided into the active information and the passive information as described above, is displayed in a corresponding area of the display area 700 where a virtual image is displayable. More specifically, in the present embodiment, the display area 700 is divided into two display areas in the up-and-down directions. Then, a passive-information image that corresponds to the passive information is mainly displayed in the upper display area A of the obtained three display areas, and an active-information image that corresponds to the active information is mainly displayed in the lower display area B. Note that only some of the active-information image may be displayed upper display area A. In such cases, the active-information image is displayed in such a manner that a higher priority is given to the viewability of the passive-information image displayed in the upper display area A.

In the present embodiment, a stereoscopic image is used as the virtual image G that is displayed in the display area 700. More specifically, perspective images are used as the lane indicator image 711 and the following-distance presenting image 712 that are displayed in the upper display area A of the display area 700.

More specifically, a perspective image that is drawn by the perspective drawing method such that the length of the five horizontal lines of the following-distance presenting image 712 becomes shorter towards the upper side and the following-distance presenting image 712 heads for a single vanishing point. In particular, in the present embodiment, the following-distance presenting image 712 is displayed such that the vanishing point approximately matches the observation point of the driver 300. Due to this configuration, while the driver 300 is driving, he or she can easily perceive the depth of the following-di stance presenting image 712. Moreover, in the present embodiment, a perspective image in which the thickness of the horizontal lines becomes thinner towards the upper side and the brightness of the horizontal lines becomes lower towards the upper side is used. Due to this configuration, while the driver 300 is driving, he or she can even more easily perceive the depth of the following-distance presenting image 712.

In the description of the basic embodiment, the hardware configuration of the on-vehicle HUD 200, which is used in the first to third embodiments of the present disclosure, is described. In the embodiments described below, hardware elements are used as follows.

(1) In the first embodiment of the present disclosure, the ROM 253 includes a background light information table 253*t*, and the environmental light sensor 150 that may sense only the illuminance is used. Accordingly, the front camera 110 may be omitted. In the first embodiment, the background light indicates the light of the background of a display image that includes sign images. In cars, the background light is the light of the background image viewable through the front windshield 302.

(2) In the second embodiment of the present disclosure, the background light information table 253*t* stored in the ROM 253 and the environmental light sensor 150 that detects brightness and chromaticity are used. Accordingly, the front camera 110 may be omitted.

(3) In the third embodiment, the front camera 110 is provided. For this reason, the background light information table 253*t* stored in the ROM 253 and the environmental light sensor 150 may be omitted.

First Embodiment

In typical related art examples, an illuminance sensor that is provided for the HUD is used to control the level of brightness of the display. In such a configuration, there exist distance between the position at which the illuminance sensor is disposed and the background area. For this reason, when the brightness abruptly changes, for example, when a vehicle passes through the shade of a building or the like, a difference is caused between the actual brightness of the background and the light quantity sensed by the illuminance sensor, and the viewability temporarily decreases. It is known in the art that a camera or the like is used to capture an area ahead of the vehicle to calculate the brightness of the background area and the brightness of the display is adjusted. In such a configuration, due to, for example, variations among individuals in the location of the viewpoint of a driver, a difference is caused between the actual brightness of the background and the calculated brightness of the background. In the present embodiment, the on-vehicle HUD 200 is provided that achieves viewability in any environment regardless of the variations among individuals in drivers or surrounding environment and improves the visual recognizability in comparison to the related art.

Figure 6A:
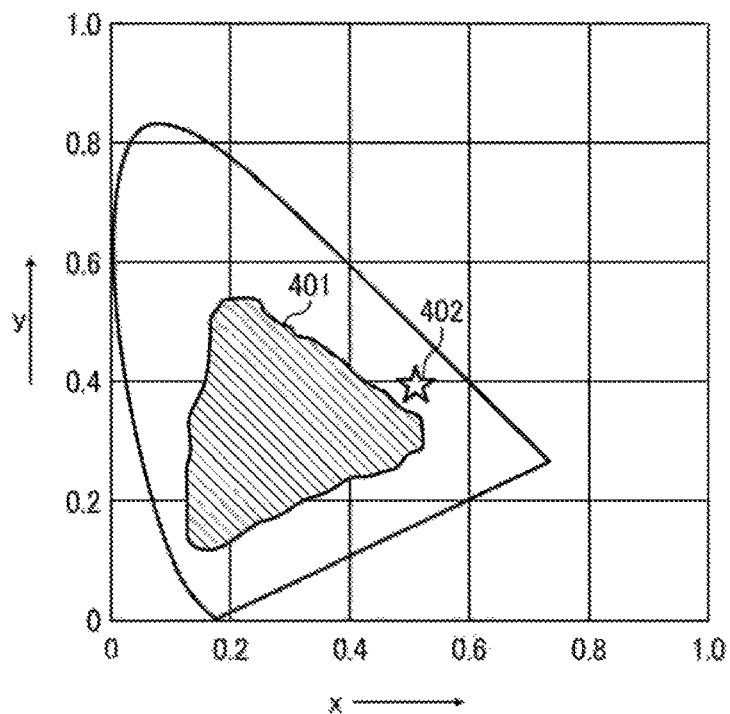
FIG. 6A is a chromaticity diagram illustrating a chromaticity coordinate area of the background light used in the HUD and chromaticity coordinates outside the color-gamut coordinate area, according to a first embodiment of the present disclosure.

FIG. 6A is a chromaticity diagram illustrating a chromaticity coordinate area 401 of the background light used in the HUD 200 according to the first embodiment of the present disclosure and chromaticity coordinates 402 outside the chromaticity coordinate area 401.

Figure 6B:
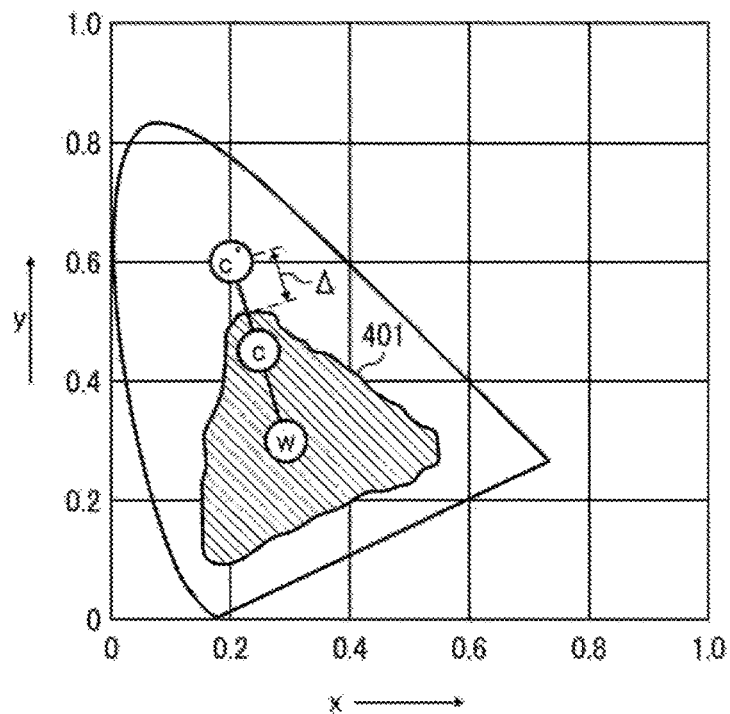
FIG. 6B is a chromaticity diagram illustrating the color conversion performed by the control system, according to a first embodiment of the present disclosure.

FIG. 6B is a chromaticity diagram illustrating the color conversion performed by the control system 250 according to the first embodiment of the present disclosure.

In the first embodiment, changes in the color of environmental light are not considered. In the first embodiment, in particular, color-gamut data of the assumed background of a display image of the HUD 200 is stored in advance in the background light information table 253*t* of the ROM 253. Then, as illustrated in FIG. 6A, the colors of a display image are corrected such that the color gamut of the display image including sign images consists of chromaticity dots (for example, chromaticity coordinates 402 indicated by a star mark) outside the color gamut of the background light (i.e., the chromaticity coordinate area 401). Due to this configuration, regardless of the state of background, a color difference is caused between the background color and the display color, and a person to visually recognize an image such as a driver can distinguish between the background and the display.

The chromaticity coordinate area data of the background light to be stored in the background light information table 253*t* may be obtained by measuring in advance the chromaticity coordinates of the light reflected from various kinds of objects and summarizing the measured data of the chromaticity coordinates. The chromaticity coordinate area of the background light can be determined by such chromaticity coordinate area data. For example, a sample is irradiated with a standard light source D65 set by the CIE (International Commission on Illumination/Commission Internationale de L'Eclairage) to measure the chromaticity coordinates of the reflection light. Alternatively, for example, as disclosed in "Pointer, M. R. (1980). The Gamut of Real Surface Colours. Color Research & Application, 5(3), 145-155," the data that is obtained in the past research where the color gamut of the light reflected from an object is compiled may substitute, as will be described later in detail with reference to FIG. 6C and FIG. 6D. In the present embodiment, a predetermined color conversion method, as described later in detail, is used to move the color coordinates outside the chromaticity coordinate area of the background light when the display colors are included in the chromaticity coordinate area of the background light. In regard to the brightness of a display image, for example, the environmental light sensor 150 is used to measure the lightness of environmental light, and the brightness of a display image is changed accordingly. Unlike the second embodiment, a unit to measure the color information of environmental light is not necessary in the first embodiment. Accordingly, the configuration can be simplified.

In the present disclosure, lower-cases "xy" indicate chromaticity coordinates, and "XYZ" in uppercase indicate the levels of tristimulus values.

Next, a color conversion method according to the first embodiment for correcting the colors of a display image is described with reference to FIG. 6B.

Firstly, in FIG. 6B, the chromaticity coordinates (xw, yw) of a white dot w are determined preparatory to color conversion. In the first embodiment, the light reflected from various kinds of objects is measured in advance, and the color of that illumination is used as a white dot. By way of example, an object is irradiated with a standard light source D65, and the chromaticity coordinates of the reflection light are measured. In the color gamut of the background that is obtained by measurement, chromaticity coordinates (xw, yw)=(0.3127, 0.3290) of the standard light source D65 are used as the chromaticity coordinates of a white dot. In addition to these chromaticity coordinates, as illustrated in FIG. 6B, the chromaticity coordinates (xc, yc) of a color c on the display image are obtained. For example, when the display image indicates the information of sRGB (D65), the chromaticity coordinates (Xc, Yc, Z) of the display image are converted into chromaticity coordinates (xc, yc) using the following equations.

$xc=Xc/(Xc+Yc+Zc)$ $yc=Yc(Xc+Yc+Zc)$ [Formula 1]

$Xc=0.4124Rc+0.3576Gc+0.1805Bc$ $Yc=0.2126Rc+0.7152Gc+0.0722Bc$ $Zc=0.0193Rc+0.1192Gc+0.9505Bc$ [Formula 2]

When the display image is described by a different color space format, color conversion is performed according to that color space format to obtain (xc, yc).

Next, a vector that connects the white dot w and a chromaticity dot c on the display image illustrated in FIG. 6B is derived. Accordingly, a vector where the white dot w and the chromaticity dot c on the display image are the starting point and the ending point, respectively, is obtained. On the extension of the obtained vector extended from the ending point c, a chromaticity dot c' of a post-color-conversion display image is set. In so doing, a color difference Δ is set between the chromaticity dot c' and the chromaticity coordinate area 401 that is the color gamut of the background light. The color difference Δ is, for example, distance on an xy plane and takes on a value of 0.05 that is equal to or greater than a predetermined threshold 0.05. As described above, color conversion is performed. Alternatively, different thresholds may be set for each area of chromaticity coordinates. In this process, a dot other than the white dot w may be used as a starting point of vector.

Figure 6C:
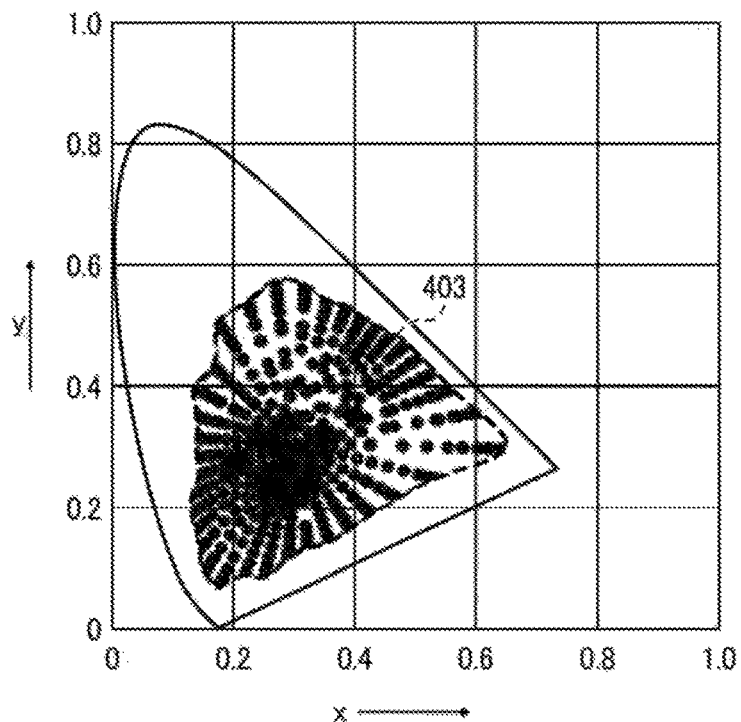
FIG. 6C is a chromaticity diagram illustrating a chromaticity coordinate area of the background light used in the HUD, according to a first embodiment of the present disclosure, and the data listed in "Pointer, M. R. (1980). The Gamut of Real Surface Colours. Color Research & Application, 5(3), 145-155" is plotted in FIG. 6C.

FIG. 6C is a chromaticity diagram illustrating a chromaticity coordinate area of the background light used in the HUD 200 according to the first embodiment of the present disclosure, and the data listed in "Pointer, M. R. (1980). The Gamut of Real Surface Colours. Color Research & Application, 5(3), 145-155" is plotted in FIG. 6C.

Figure 6D:
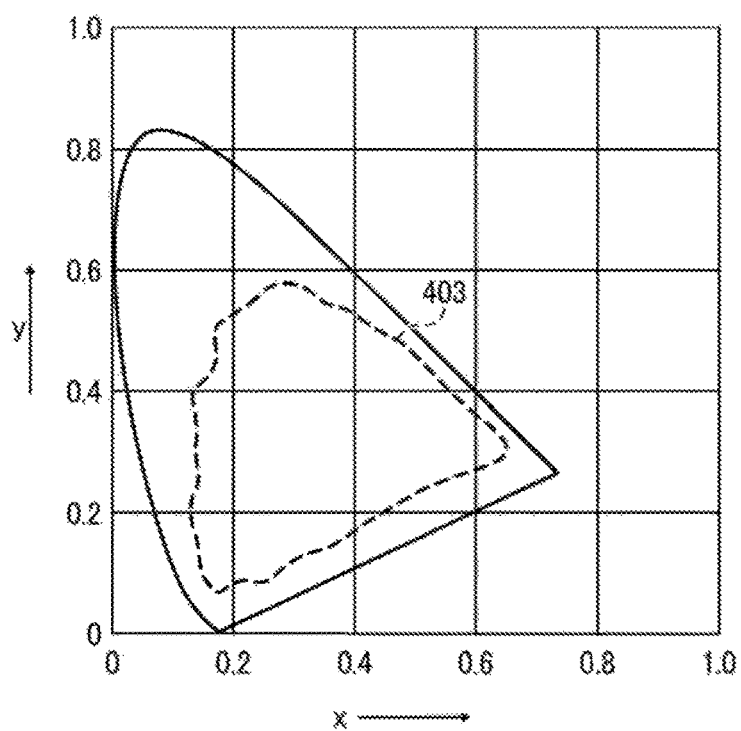
FIG. 6D is a chromaticity diagram where an envelope including the plotted area of FIG. 6C is set to be a chromaticity coordinate area of the background light, according to a first embodiment of the present disclosure.

FIG. 6D is a chromaticity diagram where an envelope including the plotted area of FIG. 6C is set to be a chromaticity coordinate area 403 of the background light.

As is apparent from FIG. 6C and FIG. 6D, it can be estimated that the light reflected from all sorts of objects existing in the nature falls within the chromaticity coordinate area 403. Accordingly, the chromaticity coordinate area 403 may be used as the chromaticity coordinate area of the background light in the present embodiment.

Figure 7:
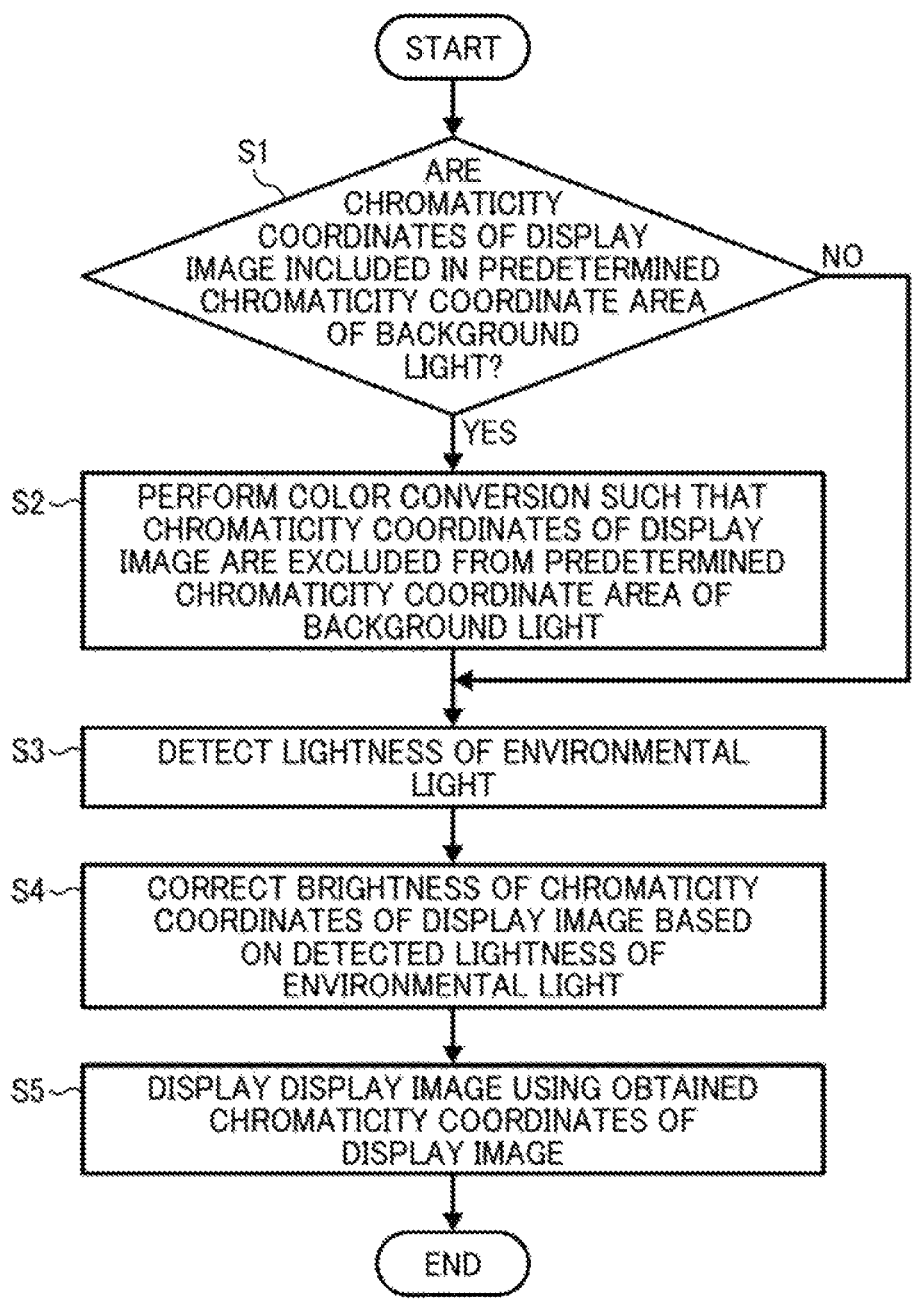
FIG. 7 is a flowchart of color correction processes performed on a display image by the control system, according to a first embodiment of the present disclosure.

FIG. 7 is a flowchart of color correction processes performed on a display image by the control system 250 according to the first embodiment of the present disclosure.

In step S1 of FIG. 7, it is determined whether the chromaticity coordinates of a display image are included in a predetermined chromaticity coordinate area of the background light. If "YES" in step S1, the process proceeds to S2. If "NO" in step S1, the process proceeds to S3. In step S2, color conversion is performed such that the chromaticity coordinates of the display image are excluded from the predetermined chromaticity coordinate area of the background light. In step S3, the environmental light sensor 150 is used to detect the lightness of environmental light. In step S4, the brightness of the chromaticity coordinates of the display image is corrected based on the detected lightness of environmental light. Then, in step S5, the display image is displayed using the obtained chromaticity coordinates of the display image, and the color correction of display image ends.

According to the present embodiment as described above, color-gamut data of the assumed background of a display image of the HUD 200 is stored in advance, and color correction is performed such that the colors of a display image are excluded from the stored color gamut. Due to this configuration, regardless of the state of background, a color difference is caused between the background color and the display color, and a person to visually recognize an image such as a driver can distinguish between the background and the display. Accordingly, the on-vehicle HUD 200 can be provided that achieves viewability in any environment regardless of the variations among individuals in drivers.

In the color correction processes of display image illustrated in FIG. 7, the processes in steps S3 and S4 may be omitted when necessary. Alternatively, the processes in steps S3 and S4 may be added, when necessary, to the processes in FIG. 11 as will be described later.

In the color correction processes of display image illustrated in FIG. 7, the chromaticity coordinates of the display colors may be determined based on the chromaticity coordinate area information of the background light such that the display colors of the display image are excluded from the predetermined chromaticity coordinate area of the background light.

Modification of First Embodiment

In the first embodiment as described above, the color correction processes are performed when a display image to be displayed by the HUD 200 is sequentially generated. However, no limitation is intended thereby. When a display image to be displayed by the HUD 200 is known and sign images for the display image are to be produced, in a similar manner to the first embodiment, the sign images for the display image may be produced such that the chromaticity coordinates of the display image are excluded from the chromaticity coordinate area of the background light.

Second Embodiment

Figure 8:
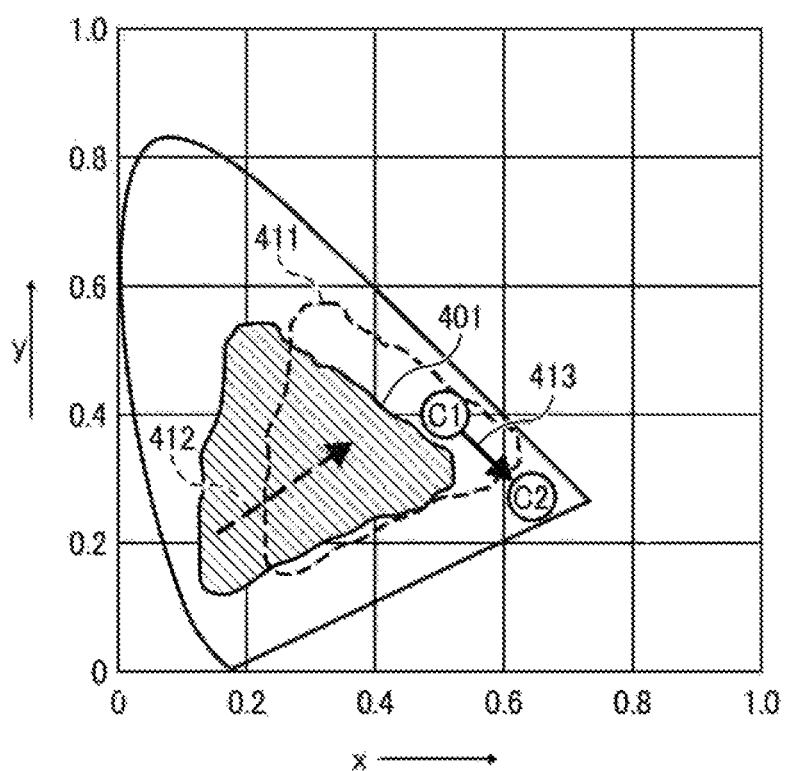
FIG. 8 is a chromaticity diagram illustrating the color conversion performed by the control system, according to a second embodiment of the present disclosure.

FIG. 8 is a chromaticity diagram illustrating the color conversion performed by the control system 250 according to the second embodiment of the present disclosure.

In the second embodiment, the chromaticity coordinates of display colors are adjusted according to changes in chromaticity of environmental light, and FIG. 8 is a chromaticity diagram illustrating how color correction is performed on display colors. The light reflected from the background changes as the chromaticity of environmental light changes. For example, the scenery appears to be reddish at sunset. In the second embodiment, the environmental light sensor 150 including a colorimetry sensor that detects the chromaticity of environmental light is used, and preferably, the environmental light sensor 150 detects the brightness and chromaticity coordinates. Then, the brightness information and chromaticity information of the environmental light are used to perform chromaticity correction with reference to the chromaticity coordinates of the chromaticity coordinate area of the background light, which is measured and stored in advance in the background light information table 253*t*. In other words, as illustrated in FIG. 8, color conversion is performed such that the chromaticity coordinate area 401 of the background light are converted into the chromaticity coordinate area 411 of the environmental light, as indicated by an arrow 412. As the result of color conversion, when the colors of a display image overlap with the chromaticity coordinate area 411 of the background light (see, for example, chromaticity coordinates C1 in FIG. 8), as indicated by an arrow 413, color conversion is performed such that the colors of a display image are excluded from the newly set chromaticity coordinate area 411 of the background light.

Next, the correction of the chromaticity coordinate area of background light as a function of environmental light, according to the second embodiment of the present disclosure, is described.

In a similar manner to the first embodiment, the information of the chromaticity coordinates (xw, yw) of a white dot is stored in the ROM 253 in advance. From the environmental light sensor 150 including a colorimetry sensor that detects the chromaticity of environmental light, tristimulus values (Xe, Ye, Ze) of the environmental light are output. Note that a colorimetry sensor using RGB values may be used instead of the colorimetry sensor as described above. In such cases, RGB values are color-converted into tristimulus values (Xe, Ye, Ze). For example, when the format of RGB values is in sRGB (D65), color conversion is performed as in the following equations.

$$Xe = 0.4124R + 0.3576G + 0.1805B$$

$$Ye = 0.2126R + 0.7152G + 0.0722B$$

$$Ze = 0.0193R + 0.1192G + 0.9505B \quad \text{[Formula 3]}$$

The chromaticity coordinates of the white dot w and the tristimulus values of environmental light are used to calculate a correction factor in that environment. The procedure for calculating a correction factor is as follows.

(1) The chromaticity coordinates (xw, yw) of the white dot w are converted into tristimulus values (Xw, Yw, Zw) using the equations given below. Note that the value of Yw does not affect the result of correction of the chromaticity coordinate area of the background light. For this reason, any desired value except "0" may be used for Yw.

$$Xw = Yw/yw \times xw$$

$$Zw = Yw/yw \times (1 - xw - yw) \quad \text{[Formula 4]}$$

(2) Next, correction factors α, β, γ are calculated as in the following equations.

$$\alpha = Xe/Xw$$

$$\beta = Ye/Yw$$

$$\gamma = Ze/Zw \quad \text{[Formula 5]}$$

The procedure for performing color correction on the points within the chromaticity coordinate area 401 of the background light is described as follows. Here, the points within the chromaticity coordinate area 401 of the background light may be all the points of the measurement results on a sample, which is measured to obtain the background region. Alternatively, the points within the chromaticity coordinate area 401 of the background light may be some of the points that are reduced to a certain extent not affecting the shape of the chromaticity coordinate area of the background light.

(1) Color conversion is performed such that the chromaticity coordinates (xb, yb) of the points within the chromaticity coordinate area 401 of the background light are converted into tristimulus values (Xb, Yb, Zb). Note that the value of Yw does not affect the result of correction of the chromaticity coordinate area of the background light. For this reason, any desired value except "0" may be used for Yw.

$$Xb = Yb/yb \times xb$$

$$Zb = Yb/yb \times (1 - xb - yb) \quad \text{[Formula 6]}$$

(2) The intensities of the tristimulus values (Xb, Yb, Zb) of the points within the chromaticity coordinate area 401 of the background light are corrected as in the following equations.

$$Xb' = \alpha \times Xb$$

$$Yb' = \beta \times Yb$$

$$Zb' = \gamma \times Zb \quad \text{[Formula 7]}$$

(3) Color conversion is performed on the corrected tristimulus values (Xb', Yb', Zb') into chromaticity coordinates (xb', yb') using the equations given below.

$$xb' = Xb'/(Xb' + Yb' + Zb')$$

$$yb' = Yb'/(Xb' + Yb' + Zb') \quad \text{[Formula 8]}$$

Based on the corrected chromaticity coordinates (xb', yb') of points as obtained above, the chromaticity coordinate area of the background light is adjusted again, and color conversion is performed accordingly on a display image including sign images. The color conversion according to the present embodiment is similar to that of the first embodiment. However, in the present embodiment, the chromaticity coordinates of the environmental light that are obtained by the environmental light sensor 150, which serves as a colorimetry sensor, are used for the chromaticity coordinates of the white dot.

Figure 9:
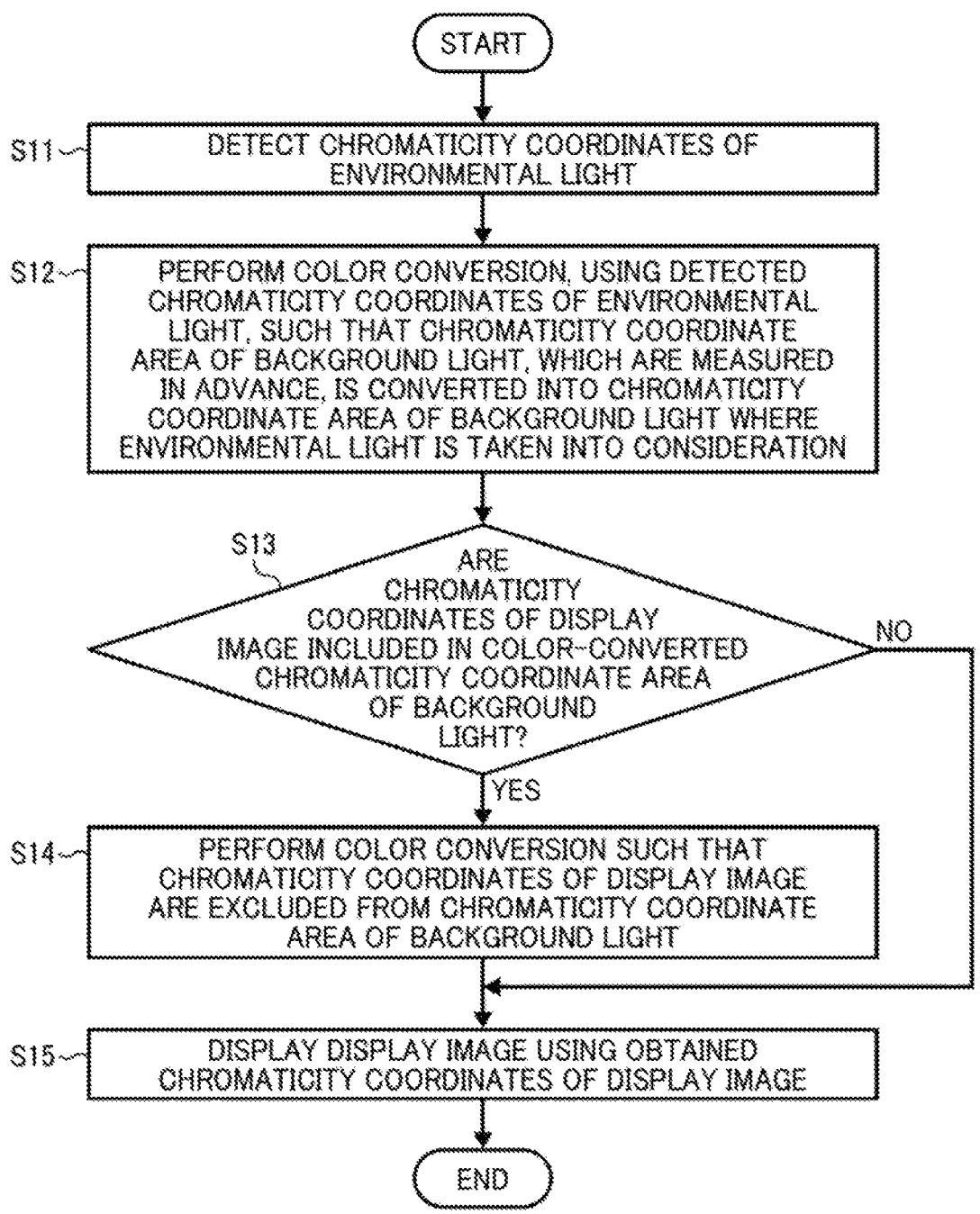
FIG. 9 is a flowchart of color correction processes performed on a display image by the control system, according to a second embodiment of the present disclosure.

FIG. 9 is a flowchart of color correction processes performed on a display image by the control system 250 according to the second embodiment of the present disclosure.

In step S11 of FIG. 9, the environmental light sensor 150 is used to detect the chromaticity coordinates of environmental light. Subsequently, in step S12, the detected chromaticity coordinates of environmental light are used to color conversion is performed such that the chromaticity coordinate area 401 of the background light, which are measured in advance, is converted into the chromaticity coordinate area 411 of the background light where the environmental light is taken into consideration. Then, in step S13, it is determined whether the chromaticity coordinates of a display image are included in the color-converted chromaticity coordinate area of the background light. If "YES" in step S13, the process proceeds to S14. If "NO" in step S13, the process proceeds to S15. In step S14, color conversion is performed such that the chromaticity coordinates of the display image are excluded from the predetermined chromaticity coordinate area of the background light. In step S15, the display image is displayed using the obtained chromaticity coordinates of the display image, and the color correction of display image ends.

In the present embodiment as described above, the detected chromaticity coordinates of environmental light are used to perform color conversion such that the chromaticity coordinate area of the background light, which are measured in advance, are converted into the chromaticity coordinate area of the background light where the environmental light is taken into consideration. Accordingly, the colors of a display image can be adjusted according to the changes in background light due to environmental light, and the visibility for a person to visually recognize the image significantly improves.

The color correction according to the second embodiment is applied to the color correction according to the first embodiment, as described above. However, no limitation is intended thereby, and the color correction according to the second embodiment may be applied to the color correction according to a third embodiment as will be described later.

Third Embodiment

Figure 10:
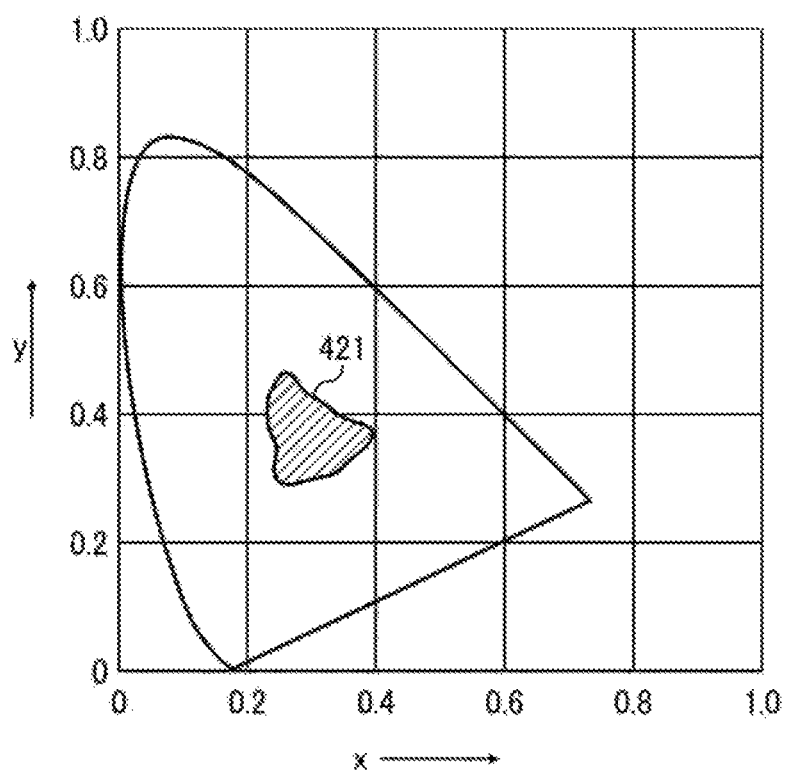
FIG. 10 is a chromaticity diagram illustrating the color conversion performed by the control system, according to a third embodiment of the present disclosure.

FIG. 10 is a chromaticity diagram illustrating the color conversion performed by the control system 250 according to the third embodiment of the present disclosure.

In the third embodiment, the chromaticity coordinate area 401 of the background light is not set in advance unlike the first and second embodiments, but the two-dimensional distribution data of the background light is used to obtain the information of the chromaticity coordinate area 421 (see FIG. 10) of the background light. The two-dimensional distribution data of the background light is obtained, for example, by using the front camera 110 disposed on a vehicle, or by measuring such two-dimensional distribution with a plurality of photodiodes disposed towards the area in front of the vehicle. Alternatively, the two-dimensional distribution data of background light that is measured by other sorts of means may be used.

While the vehicle is traveling, the front camera 110 collects the chromaticity coordinates of an area that serves as the background image of the HUD 200, for example, at regular time intervals to obtain the information of the chromaticity coordinate area 421 of the background light, and store the obtained information in the RAM 254. The chromaticity coordinates of the chromaticity coordinate area 421 of the background light stores only the data of prescribed length of time (for example, the data of ten minutes). When new data is acquired by measurement, old measured values are deleted, and the chromaticity coordinate area of background light is adjusted. In the first and second embodiments, the chromaticity coordinate area of background light tends to be too broadly set. However, in the third embodiment, the chromaticity coordinate area of background light is set according to the actual environment on the roads. For this reason, the chromaticity coordinate area of the background light is not too broadly set. Accordingly, a wide range of colors can be used as display colors of a display image.

Next, the color conversion according to the third embodiment of the present disclosure is described.

A method for setting a white dot w according to the third embodiment is different from that of the first and second embodiments. The images of the area in front of the vehicle, which are captured by the front camera 110, are used to calculate the average color of the images, and the calculated average color is used as the white dot w. In order to derive such an average color, firstly, the sum of all the pixel values of captured images is calculated, and then the obtained sum of the pixel values are divided by the number of pixels n. By so doing, averages Rave, Gave, and Bave are calculated for RGB (red, green, blue) values.

$Rave = \Sigma R/n$ $Gave = \Sigma G/n$ $Bave = \Sigma B/n$ [Formula 9]

The obtained averages Rave, Gave, and Bave for RGB values are converted into chromaticity coordinates using the following equations, and the chromaticity coordinates of the white dot w are obtained.

$xw = Xw/(Xw+Yw+Zw)$ $yw = Yc/(Xw+Yw+Zw)$ [Formula 10]

$Xw = 0.4124 Rave + 0.3576 Gave + 0.1805 Bave$ $Yw = 0.2126 Rave + 0.7152 Gave + 0.0722 Bave$ $Zw = 0.0193 Rave + 0.1192 Gave + 0.9505 Bave$ [Formula 11]

In this configuration, the environmental light sensor 150, which includes a colorimetry sensor and is separate from the front camera 110, is used to obtain the chromaticity coordinates of environmental light, and the obtained chromaticity coordinates of environmental light are used as the white dot w. Alternatively, the white dot may be set to chromaticity coordinates (x, y)=(0.3127, 0.3290) of the standard light source D65.

Figure 11:
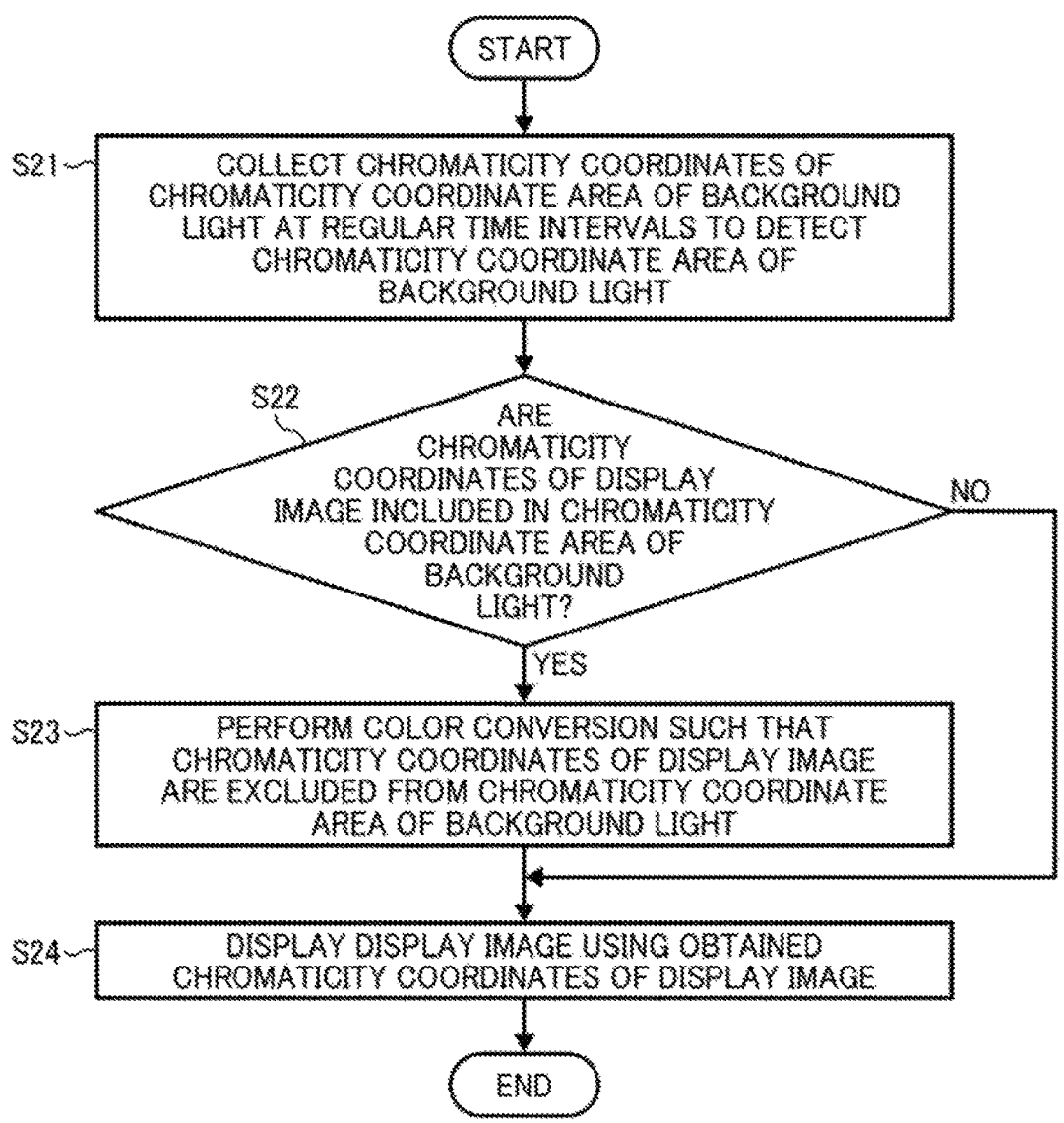
FIG. 11 is a flowchart of color correction processes performed on a display image by the control system, according to a third embodiment of the present disclosure.

FIG. 11 is a flowchart of color correction processes performed on a display image by the control system 250 according to the third embodiment of the present disclosure.

In step S21 of FIG. 11, the front camera HO is used to collect the chromaticity coordinates of chromaticity coordinate area of the background light, for example, at regular time intervals to detect the chromaticity coordinate area of the background light. In step S22, it is determined whether the chromaticity coordinates of a display image are included in the chromaticity coordinate area of the background light. If "YES" in step S22, the process proceeds to S23. If "NO" in step S22, the process proceeds to S24. In step S23, color conversion is performed such that the chromaticity coordinates of the display image are excluded from the predetermined chromaticity coordinate area of the background light. In step S24, the display image is displayed using the obtained chromaticity coordinates of the display image, and the color correction of display image ends.

In the embodiments of the present disclosure as described above, the detected chromaticity coordinates of environmental light are used to perform color conversion such that the chromaticity coordinate area of the background light, which are actually measured, are converted into the chromaticity coordinate area of the background light where the environmental light is taken into consideration. Accordingly, the colors of a display image can be adjusted according to the changes in background light due to environmental light, and the visibility for a person to visually recognize the image significantly improves.

The color correction according to the first to third embodiments of the present disclosure as described above may be performed repeatedly at predetermined time intervals.

The color correction according to the first to third embodiments of the present disclosure may be applied, for example, only to a certain display image such as warning display.

In the third embodiment, a chromaticity coordinate area of background light is not set in advance. Instead, a vehicle-installed camera is used to obtain the chromaticity coordinate area information of the background light while the vehicle is travelling. In the first and second embodiments as described above, the chromaticity coordinate area of background light tends to be too broadly set. However, in the third embodiment, the chromaticity coordinate area of background light is set according to the actual environment on the roads. For this reason, the chromaticity coordinate area of the background light is not too broadly set. Accordingly, a wide range of colors can be used as display colors of a display image. In the third embodiment, an area that overlaps with a display area of the HUD is captured by a camera, and the chromaticity coordinate area information of background light is obtained from the captured image of the two-dimensional distribution of color information of the chromaticity coordinate area of background light.

Figure 12:
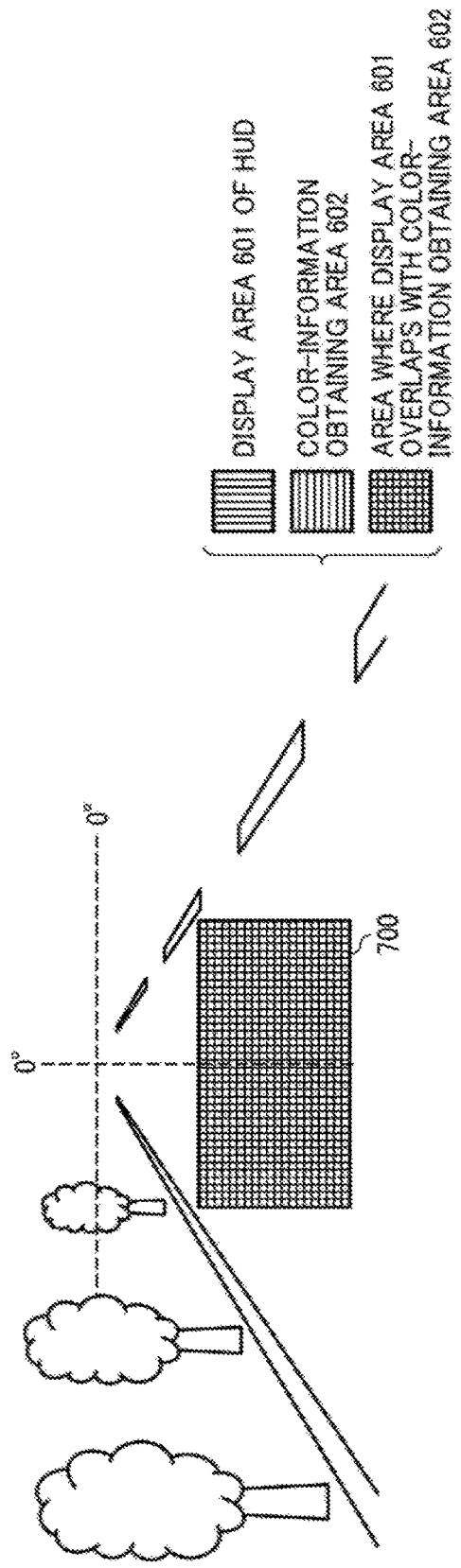
FIG. 12 is a front view of a color information obtaining area where the color information is obtained by the control system, when viewed from a viewpoint of a driver, according to a third embodiment of the present disclosure.

FIG. 12 is a front view of a color information obtaining area where the color information is obtained by the control system 250, when viewed from a viewpoint of a driver, according to a third embodiment of the present disclosure.

In other words, FIG. 12 is a front view of a color-information obtaining area 602 and a display area 601 of the HUD 200, when viewed from a viewpoint of a driver, and the color-information obtaining area 602 overlaps with the display area 601 in the display area 700.

Figure 13:
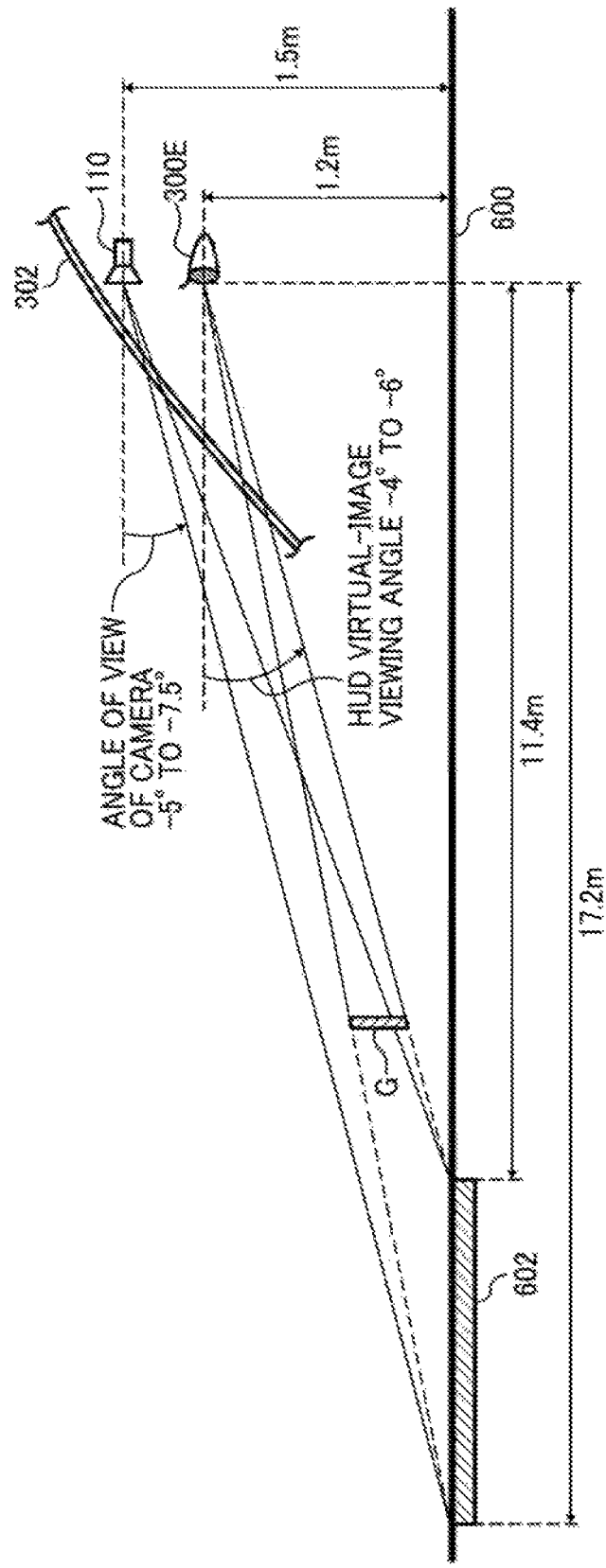
FIG. 13 is a side view of the color-information obtaining area of the embodiment illustrated in FIG. 12, when viewed from the side of a vehicle.

FIG. 13 is a side view of the color-information obtaining area 602 of the embodiment illustrated in FIG. 12, when viewed from the side of a vehicle.

Figure 14:
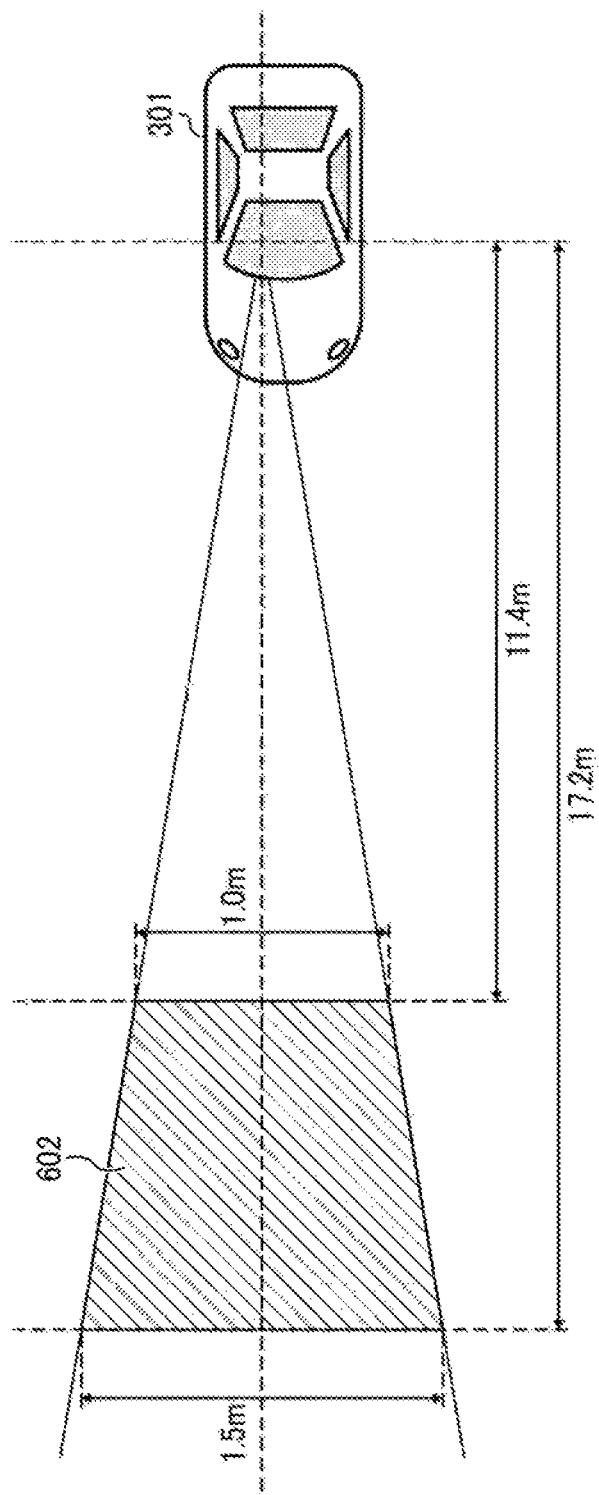
FIG. 14 is a top view of the color-information obtaining area of the embodiment illustrated in FIG. 12, when viewed from the upper side of a vehicle.

FIG. 14 is a top view of the color-information obtaining area 602 of the embodiment illustrated in FIG. 12, when viewed from the upper side of a vehicle.

In FIG. 13, the location of the viewpoint of eyes 300E of a driver is at a height of 1.2 meters (m) above a road surface 600, and the angles of view of the HUD 200 are 5° in the horizontal direction, 2° in the vertical direction, and 5° in the angle of depression. FIG. 13 illustrates the color-information obtaining area 602 when the front camera 110 is at a height of 30 centimeters (cm) above the location of the viewpoint of the eyes 300E of the driver inside the front windshield 302. Under these conditions as described above, as illustrated in FIG. 13, the color-information obtaining area 602 ranges from 11.4 m to 17.2 m ahead of the viewpoint of the driver. In order to capture the color-information obtaining area 602 by the front camera 110 that is disposed above the driver, the angle of view of the front camera 110 is, for example, −5° to −7.5°. FIG. 13 merely illustrates an example case, and the specification or installation conditions of the front camera 110 are not limited thereby. Note also that the two-dimensional distribution of the chromaticity coordinate area of the background light may be obtained from the information obtained from a vehicle-installed camera such as a stereo camera or a drive recorder.

FIG. 14 is a top view of the color-information obtaining area 602, when viewed from the upper side of the vehicle under these conditions as described above.

As is apparent from FIG. 14, the color-information obtaining area 602 is in a shape of trapezoid on the road surface 600 as diagonally shaded.

Figure 15:
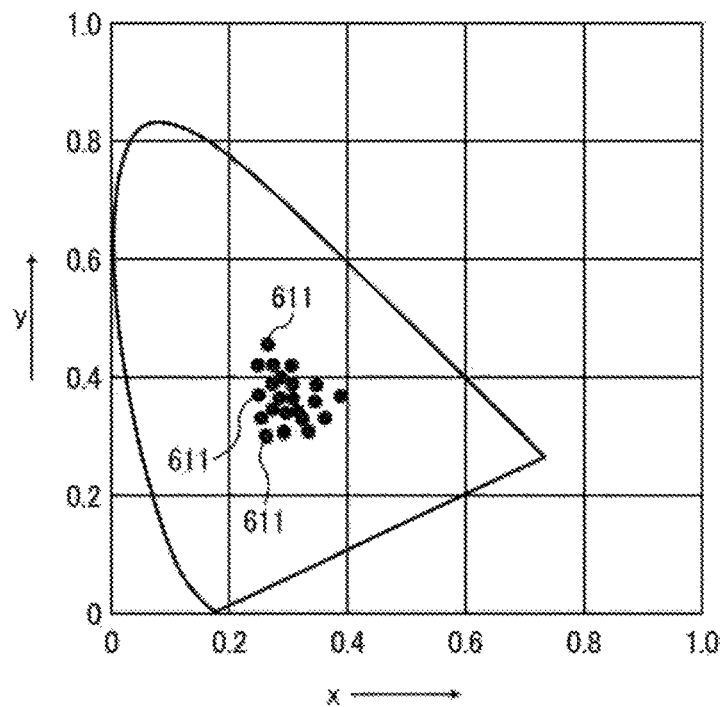
FIG. 15 is a chromaticity diagram illustrating a method of determining the chromaticity coordinate area of background light, according to the embodiment FIG. 12.
Figure 16:
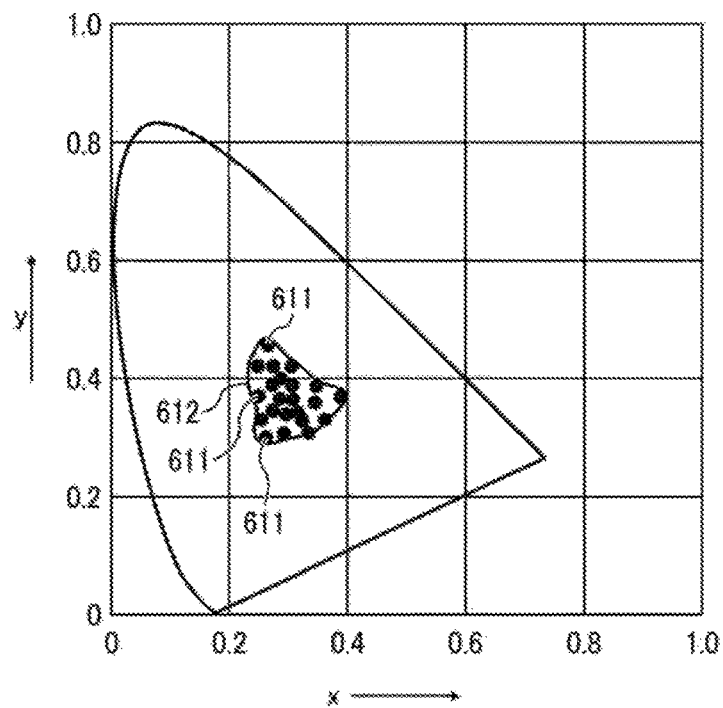
FIG. 16 is a chromaticity diagram illustrating a method of determining the chromaticity coordinate area of background light, according to the embodiment FIG. 12.

FIG. 15 and FIG. 16 are chromaticity diagrams illustrating a method of determining the chromaticity coordinate area of background light, according to the embodiment FIG. 12.

The method of determining the chromaticity coordinate area of the background light according to the embodiment illustrated in FIG. 12 is as follows.

The background color information to be used is obtained by cropping the color-information obtaining area 602 from the images captured by the RGB front camera 110 and putting plots, for example, of the chromaticity per pixel on a chromaticity diagram of x-y plane. In FIG. 15, a plurality of plots 611 of chromaticity are placed. FIG. 16 illustrates a result of setting an area 612 that contains the plots, using, for example, a convex hull, from the distribution of the plots 611 as illustrated in FIG. 15. For example, a gift wrapping algorithm is used for the convex hull to set the area 612 that contains the plots. The RGB camera 110 is used to capture images at prescribed time intervals (for example, every five seconds), and the data of prescribed length of time (for example, the data of ten minutes) is stored. When new data is acquired by measurement, the oldest measured values are deleted, and the chromaticity coordinate area of background light is adjusted. Due to the steps as described above, the chromaticity coordinate area of background light can be determined.

[Differences from JP-2015-178297-A]

In JP-2015-178297-A, it is aimed at letting a user visually recognize a virtual image in a clear manner regardless of the surrounding environment. Moreover, the surrounding environment of a position at which a virtual image is produced is obtained, and the brightness of a light source and the brightness of the color components (RGB) of moving images to be projected are adjusted based on the obtained surrounding environment. However, there is a problem that the viewability decreases as the precision of the measurement of the brightness of background light is insufficient.

In the embodiments of the present disclosure as described above, the HUD 200 to be used in cars is described. However, no limitation is intended thereby. The HUD 200 according to the embodiments as described above may be applied to other various kinds of vehicles or image display apparatuses such as display devices, or may be used for other various kinds of purposes.

In the embodiments described above, color conversion and correction are performed such that the color difference between the chromaticity of a display image and the chromaticity of a background image becomes equal to or greater than a prescribed threshold. Accordingly, the viewability of the display image improves in comparison to the related art. Such a display image that is to be color-converted and corrected may be limited to displays of warning or danger that warn a driver that, for example, his/her vehicle is approaching a vehicle ahead too close.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

What is claimed is:

1. An image display apparatus, comprising:
    an image-light projection device configured to display a display image; and processing circuitry configured to
- determine whether a chromaticity of the display image is within a predetermined two-dimensional chromaticity coordinate area of background light of the display image, the predetermined two-dimensional chromaticity coordinate area including a plurality of different coordinates within a defined closed boundary, and
- when determining that the chromaticity of the display image is within the predetermined two-dimensional chromaticity coordinate area of the background light of the display image, convert the chromaticity of the display image into a chromaticity outside the predetermined two-dimensional chromaticity coordinate area of the background light having the defined closed boundary.

2. The image display apparatus according to claim 1, further comprising
a first detector configured to detect a chromaticity of the background light to determine the chromaticity coordinate area of the background light.

3. The image display apparatus according to claim 2, wherein the detector is further configured to obtain a two-dimensional distribution of the background light.

4. The image display apparatus according to claim 3, wherein when the two-dimensional distribution of the background light is obtained, a chromaticity coordinate area of the background light that overlaps with the display image is obtained for conversion performed by the processing circuitry.

5. The image display apparatus according to claim 1, wherein
the chromaticity coordinate area of the background light is obtained by detecting and collecting a chromaticity of the background light in advance.

6. The image display apparatus according to claim 1, further comprising a second detector configured to detect environmental light around the display image.

7. The image display apparatus according to claim 6, wherein the processing circuitry is further configured to correct a brightness of the display image according to lightness of the environmental light detected by the second detector.

8. The image display apparatus according to claim 6,
wherein the second detector detects a chromaticity of the environmental light, and
the processing circuitry is further configured to correct the chromaticity coordinate area of the background light to a corrected chromaticity coordinate area of the background light, using the detected chromaticity of the environmental light, to convert the chromaticity of the display image into the chromaticity outside the corrected chromaticity coordinate area of the background light.

9. The image display apparatus according to claim 6,
wherein the processing circuitry is further configured to
convert the chromaticity coordinate area of the background light into a corrected chromaticity coordinate area of the background light in which the detected environmental light is taken into consideration, using a chromaticity of the detected environmental light,
the processing circuitry is further configured to determine whether the chromaticity of the display image is within the corrected chromaticity coordinate area of the background light where the environmental light is taken into consideration, and
when the chromaticity of the display image is within the corrected chromaticity coordinate area, the processing circuitry is further configured to convert the chromaticity of the display image into a chromaticity outside the corrected chromaticity coordinate area of the background light.

10. The image display apparatus according to claim 1, wherein
the processing circuitry is further configured to convert the chromaticity of the display image and a chromaticity of the chromaticity coordinate area of the background light such that a color difference between the chromaticity of the display image and the chromaticity of the chromaticity coordinate area of the background light becomes equal to or greater than a prescribed threshold.

11. The image display apparatus according to claim 1, wherein the processing circuitry is further configured to obtain a vector in which any fixed point on the chromaticity coordinate area is a starting point and a chromaticity dot of the display image is an ending point, and set a point on an extension of the obtained vector extended from the ending point as a new chromaticity dot of the display image.

12. The image display apparatus of claim 11, wherein the starting point of the vector obtained by the processing circuitry represents white.

13. The image display apparatus according to claim 1, wherein
the image display apparatus is a heads-up display that displays the display image on a front windshield or combiner of a vehicle.

14. The image display apparatus of claim 1, wherein when determining that the chromaticity of the display image is not within the predetermined chromaticity coordinate area of the background light of the display image, the processing circuitry is further configured to not convert the chromaticity of the display image.

15. A method of displaying an image, the method comprising:
- determining whether a chromaticity of the display image is within a predetermined two-dimensional chromaticity coordinate area of background light of the display image, the predetermined two-dimensional chromaticity coordinate area including a plurality of different coordinates within a defined closed boundary, and
- when determining that the chromaticity of the display image is within the predetermined two-dimensional chromaticity coordinate area of the background light of the display image, converting the chromaticity of the display image into a chromaticity outside the predetermined two-dimensional chromaticity coordinate area of the background light having the defined closed boundary.

16. The method according to claim 15, further comprising:
obtaining the chromaticity coordinate area of the background light by detecting and collecting a chromaticity of the background light in advance.

17. The method according to claim 15, further comprising:
detecting a chromaticity of the background light; and
determining the chromaticity coordinate area of the background light.

18. The method according to claim 15, further comprising
detecting lightness of environmental light around the display image, wherein the converting includes correcting brightness of the display image according to the detected lightness of the environmental light.

19. The method according to claim 15, further comprising detecting a chromaticity of environmental light around the display image,
wherein the converting includes converting the chromaticity coordinate area of the background light into a corrected chromaticity coordinate area of the background light in which the environmental light is taken into consideration,
the convening includes determining whether the chromaticity of the display image is within the corrected chromaticity coordinate area of background light, and
when the chromaticity of the display image is within the corrected chromaticity coordinate area, the converting includes converting the chromaticity of the display image into a chromaticity outside the corrected chromaticity coordinate area of the background light.

20. The method according to claim 15, wherein
the converting includes converting the chromaticity of the display image and a chromaticity of the chromaticity coordinate area of the background light such that a color difference between the chromaticity of the display image and the chromaticity of the chromaticity coordinate area of the background light becomes equal to or greater than a prescribed threshold.

* * * * *